United States Patent
Olijnyk et al.

(10) Patent No.: US 6,863,407 B1
(45) Date of Patent: Mar. 8, 2005

(54) MIRROR PARKING MECHANISM

(75) Inventors: Mark Olijnyk, Hallet Cove (AU); Gary Gordon Leslie Fimeri, Morphett Vale (AU); Paul van de Loo, Norton Summit (AU); Simon Orme, Hallett Cove (AU)

(73) Assignee: Schefenacker Vision Systems Australia Pty Ltd., Lonsdale (AU)

( * ) Notice: Subject to any disclaimer, the term of this patent is extended or adjusted under 35 U.S.C. 154(b) by 0 days.

(21) Appl. No.: 09/890,620

(22) PCT Filed: Feb. 9, 2000

(86) PCT No.: PCT/AU00/00076

§ 371 (c)(1),
(2), (4) Date: Aug. 13, 2001

(87) PCT Pub. No.: WO00/47445

PCT Pub. Date: Aug. 17, 2000

(30) Foreign Application Priority Data

Feb. 9, 1999 (AU) ............................................. PP8619

(51) Int. Cl.⁷ .......................... G02B 5/08; G02B 7/182; B60R 1/06
(52) U.S. Cl. ....................... 359/841; 359/850; 359/872; 359/877; 248/479
(58) Field of Search ................................ 359/850, 841, 359/864, 865, 872, 877; 248/479, 480

(56) References Cited

U.S. PATENT DOCUMENTS

| | | | |
|---|---|---|---|
| 4,969,727 A | * | 11/1990 | Harloff et al. |
| 5,172,884 A | | 12/1992 | Ishiyama ..................... 248/479 |
| 5,432,640 A | * | 7/1995 | Gilbert et al. |
| 5,828,504 A | * | 10/1998 | Beuzeville |
| 5,867,328 A | * | 2/1999 | Stapp et al. |
| 6,022,113 A | * | 2/2000 | Stolpe et al. |
| 6,322,221 B1 | * | 11/2001 | van de Loo |
| 6,505,943 B1 | * | 1/2003 | Olijnyk et al. |

FOREIGN PATENT DOCUMENTS

| | | |
|---|---|---|
| AU | A-68997/98 | 12/1998 |
| DE | 198 33 514 A | 3/1999 |
| EP | 0 881 124 A2 | 12/1998 |
| FR | 2667030 A | 3/1992 |
| WO | WO 02/087922 | * 11/2002 |

* cited by examiner

Primary Examiner—Ricky D. Shafer
(74) Attorney, Agent, or Firm—Warn, Hoffmann, Miller & LaLone, P.C.

(57) ABSTRACT

A minor parking mechanism for an exterior rear view mirror that rotates a mirror head to a parked position. The mechanism has a mirror mounting bracket, a mirror head pivotally connected to the mirror mounting bracket so the mirror head can rotate from a deployed position to a parked position. A detent acting between the mirror mounting bracket and the mirror head to lock and unlock the mirror head. A spring acts against and locks the detent in position. A worm drive in the mirror head moves longitudinally along a shaft and rotates about an axis to act against the spring, which in turn reduces the spring force applied to the detent to enable it to disengage whereupon continued rotation of the worm drive causes the mirror head to rotate.

11 Claims, 6 Drawing Sheets

MIRROR PARKING MECHANISM

This invention relates to an mirror parking mechanism, and in particular to a parking mechanism which is able to move a mirror from an in use or deployed position to a second position where the outermost portion of the mirror head is closer to the vehicle body on which it is mounted.

BACKGROUND OF THE INVENTION

The invention subject of this specification is a variation of the invention described in corresponding Australian Patent Application No 68997/98 entitled "A Mirror Operating Mechanism". It has a similar operating principle in that a drive means is used to move the mirror from a deployed position to what is termed a parked position with the outermost portion of the mirror head is closer to the vehicle body. This invention also has a similar operating principle in that the initial action of the drive means is to unload the detent which holds the mirror head in the deployed position before moving it to a parked position.

This has the advantage that the detent can provide sufficient holding force to prevent unwanted movement of the mirror head, while at the same time reducing the motor force required to overcome the detent to rotate the mirror head.

SUMMARY OF THE INVENTION

Accordingly, in its broadest form, the invention is a mirror parking mechanism for a vehicle exterior rear view mirror that rotates a mirror head to a parked position comprising:
  a mirror mounting bracket,
  a mirror head pivotally connected to said mounting bracket so that said mirror head can rotate from a deployed position to a parked position where the outermost portion of said mirror head is positioned closer to said vehicle,
  a detent acting between said mirror mounting bracket and said mirror head that changes from a locked position, where said mirror head is held with respect to said mirror mounting bracket, to a disengaged position where said mirror head is able to be rotated with respect to said mirror mounting bracket,
  a spring acting against said detent to hold it in said locked position,
  a gear wheel secured with respect to said mirror head,
  a worm drive having a shaft that is journalled in bearings in said mirror mounting bracket, that allows movement of said worm drive in a longitudinal direction as well as rotation about its longitudinal axis, said worm drive engaging said gear wheel and one end of said shaft acting against said spring, and
  a motor to drive said worm drive wherein during the initial rotation of said worm drive said detent prevents rotation of said gear wheel which causes said worm drive to move longitudinally and push against said spring to in turn reduce the spring force applied to said detent to enable it to disengage whereupon continued rotation of said worm drive causes said gear wheel and mirror head to rotate.

The axis of rotation of the mirror head with respect to the mounting bracket will be generally vertical, however, in some instances, this axis may be inclined from the vertical. Further, the axis may lie in a completely different plane, such as horizontal, in the case of where the mirror is folded against a vehicle in a substantially vertical plane.

As with the abovementioned earlier patent specification, the drive means preferably comprises an electric motor in combination with associated drive gears. The worm drive, which is operated by the drive means, initially causes movement of the spring holding the detent in place before it causes any rotation of the mirror head. This reduction in the force applied to the detent continues until the force required to move the spring is greater than the force required to rotate the mirror head out of the engagement with the detent. When this occurs, the worm drive remains stationery with respect to its bearings and rotates the gear wheel and mirror head.

Preferably, the mirror head is pivotally attached to the mounting bracket by a spigot or pin connection. Either of the parts may be provided with a spigot with the other part having a corresponding aperture within which the spigot locates. Alternatively, each part may be provided with an aperture through which a pin locates to pivotally connect the components.

The axis of the gear wheel is preferably coaxial with the pivot connection between the mirror head and mounting bracket. The gear wheel may also be releasably held with respect to the mirror head so that, in normal circumstances, rotation of the gear wheel will cause rotation of the mirror head. However, this engagement is releasable so that if the mirror head is manually moved or impacted, the connection between the gear wheel and the mirror head can be released to allow rotation of the mirror head.

Preferably, the interface between the gear wheel and the mirror head comprises a clutch that in normal circumstances provides sufficient coupling between the gear wheel and the mirror head. If force is applied directly to the mirror head, the clutch can disengage to thereby enable the mirror head to rotate freely with respect to the gear wheel.

Preferably, the clutch comprises a plurality of projections on the gear wheel which locate within correspondingly shaped recesses within the mirror head. A spring is used to force the projections into engagement with the recesses and therefore provide the necessary coupling between the gear wheel and the mirror head. If manual force is applied to the mirror head, then the gear wheel will not be able to rotate as a result of its engagement with the worm drive. Continuous rotation of the mirror head will overcome the spring force applied to the gear wheel and cause the gear wheel to separate with respect to the mirror head thereby disengaging the projections from the corresponding recesses.

The extent to which the mirror head is driven by the drive means will depend upon either abutment of the mirror head against the vehicle, or abutment of a portion of the mirror head against the mounting bracket that prevents further rotation. Preferably, the drive means motor is provided with current sensing circuitry which can sense an increase in current drawn upon the mirror head reaching the limit of its travel. The circuitry is able to de-energise the motor upon the increase in current being sensed.

From the parked position, the operation of the drive means is reversed and will drive the mirror head back to its deployed position. The detents will re-engage at the deployed position resulting in stalling of the drive means, an increase in current draw and resultant de-energisation of the motor.

In another aspect of the invention, the pivot connection between the mirror head and mirror bracket may be such as to allow movement of the mirror head in a direction which is normal to the axis of the pivot connection. The resilient means may comprise springs which are used to force the mirror head against detents which hold the mirror head in its deployed position. The drive means may be secured to the mirror head so that it operates a roller along a ramped surface that initially applies a force against the mirror head so that the mirror head is moved away from engagement with the detent. Once the detent holding force is reduced sufficiently, continued operation of the drive means will disengage the mirror head from the detents and will in turn rotate the mirror head with respect to the mounting bracket.

DESCRIPTION OF THE DRAWINGS

Embodiments of the invention will now be described, but it should be realised that the scope of the invention is not to be limited to the specific detail of the embodiments. The embodiments are illustrated in the accompanying drawings in which.

DETAILED DESCRIPTION OF THE PREFERRED EMBODIMENTS

Figure 1:
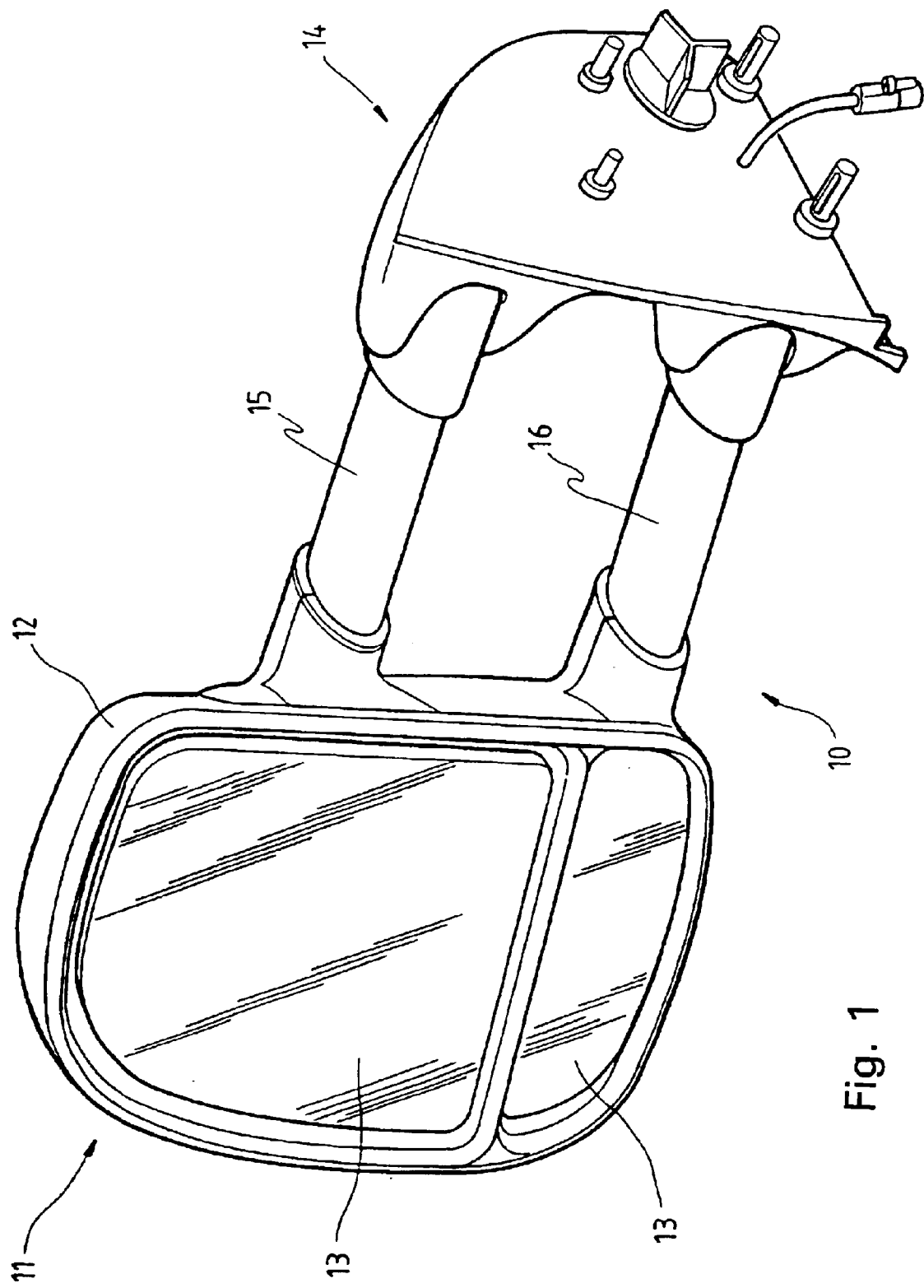
FIG. 1 shows a perspective view of a rear view mirror assembly according to this embodiment.

FIG. 1 illustrates a rear view mirror assembly 10 which comprises a mirror head 11. The mirror head 11 has a mirror case 12 that supports mirrors 13. The mirror head 11 is attached to a mounting bracket 14 via an upper and lower arms 15 and 16. The mounting bracket 14 is designed to attach to the side of a motor vehicle.

Each of the upper and lower arms 15 and 16 pivotally attach to the mounting bracket 14. According to this invention, drive means is provided which can move the mirror head 11 from a deployed position to a parked position where the outermost portion of the mirror head is brought as close as possible to the side of the motor vehicle. Preferably, the mirror head 11 is rotated so that the mirrors 13 face towards the side of the vehicle.

FIG. 1 shows a rear view mirror assembly 10 for use on the left-hand side of a vehicle. It will be obvious that the invention is equally suited to a mirror for use on the right-hand side of a vehicle. Some components will be a mirror image to those on the other side of the vehicle, although many of the components will be interchangeable between the left-hand and right-hand version.

Figure 2:
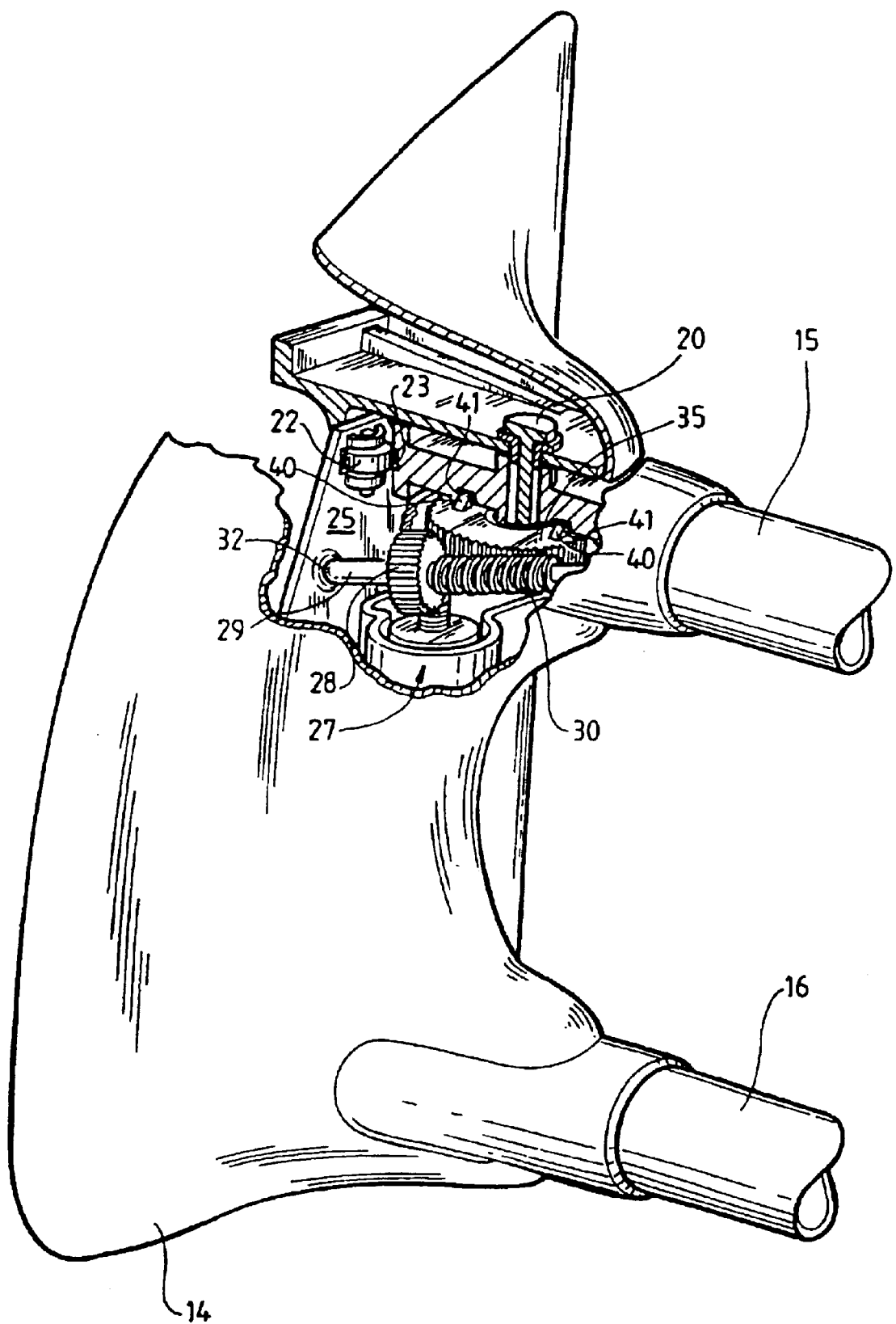
FIG. 2 shows a part perspective view that is partly cut-away to reveal aspects of the drive means, detent and resilient means.

FIG. 2 shows the upper arm 15 pivotally attached to the mounting bracket via pivot pin 20. The lower arm 16 is pivotally attached to the mounting bracket by a similar pivot pin 20. The pivot pin 20 on both the upper and lower arms 15 and 16 enable the mirror head 11 to rotate with respect to the mounting bracket 14.

The detent comprises a detent roller 22 that engages within a detent recess 23 that is in the end of each of the upper and lower arms 15 and 16. Each of the detent rollers 22 are pivotally mounted in a spring plate 25 that, as will be explained later, comprises a resilient means that forces each of the detent rollers 22 into the detent recesses 23. The mirror head 11 is held in a deployed position while the detents are engaged.

Figure 3:
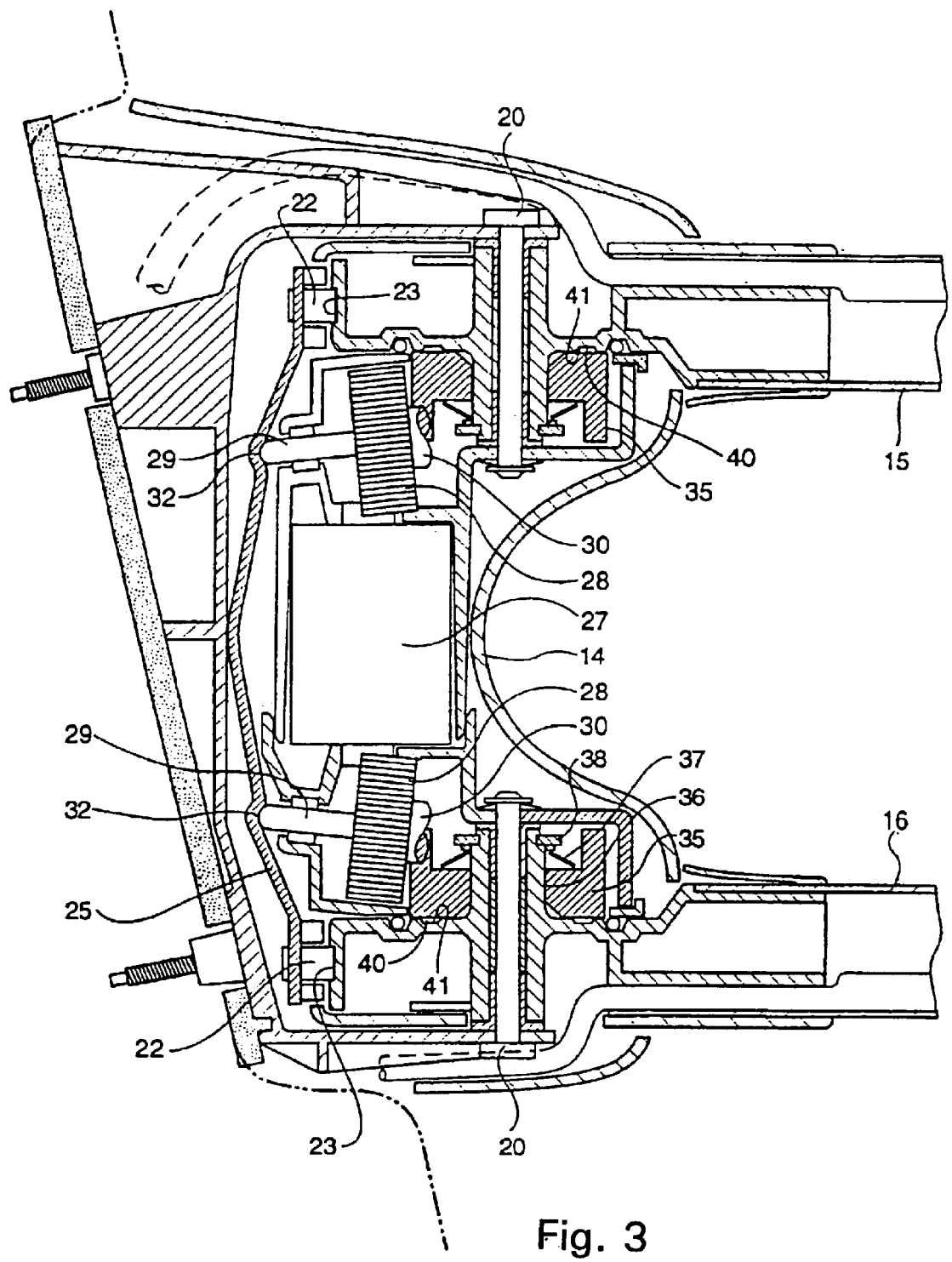
FIG. 3 shows a part cross-sectional view of the mirror parking mechanism.

FIG. 3 shows a cross-sectional view of the mounting bracket 14 and the pivot connections between the upper and lower arms 15 and 16 and the mounting bracket 14. The drive means 27 comprises an electric motor with a common drive shaft that extends either side of the motor. There is a first worm drive on either side of the electric motor that engage secondary drive gears 28. The secondary drive gear 28 is mounted on a shaft 29. In addition to carrying the secondary drive gear 28, the shaft 29 also carries the main drive worm 30. The shaft 29 is journalled for rotation about its axis, and an end of the shaft 32 locates within a depression formed in the spring plate 25.

The main drive worm 30 on each shaft 29 engages the main gear wheel 35. The main gear wheel 35 is journalled for rotation about spigot 36 through which the pivot pin 20 locates. Each main gear wheel 35 is held to each of the spigots 36 via a belleville washer 37 and a retainer clip 38. The belleville washer 37 provides a resilient spring force to an outer surface of the main gear wheel 35.

The main drive gear 35 is also provided with a release to allow break-away of the mirror head 11 which comprise projections 40 that are located within corresponding recesses 41 in the upper and lower arms 15 and 16. The projections and recesses 40 and 41 together comprise a clutch, the operation of which will be described below.

When the drive means 27 is operated, the motor worm drives the secondary drive gear 28 and main drive worm 30. As the spring plate 25 is applying maximum force to the detent rollers 22, the main gear wheels 35 resist rotation. Accordingly, as the secondary drive gear 28 and the main drive worm 30 rotate, the shaft 29 is caused to move along its longitudinal axis. This results in the end of each shaft 32 pressing against the spring plate 25.

As operation of the drive means 27 continues, the spring plate 25 is progressively pushed and thereby reduces the load applied to each of the detent rollers 22. When the force applied by each of the detent rollers 22 reduces sufficiently, the force required to further displace the shaft 29 is greater than the force required to rotate each of the main gear wheels 35. At this point, the main drive worms 30 rotate the main gear wheels 35 and the upper and lower arms 15 and 16, which are coupled to the main gear wheels 35 about pivot pins 20. This results in rotation of the mirror head 20. This rotation continues until the detent rollers 22 either engage further detents, or the mirror head 11 reaches a predetermined stop point which in turn causes the electric motor of the drive means 27 to stall. This results in a sudden increase in current drawn by the motor which is sensed by electronic control means. The motor is then de-energised.

Additional detent recesses may be provided for when the mirror head moves to its parked position. These additional detent recesses are preferably not as deep as the detent recesses 23 which provides sufficient holding force while at the same time allowing the drive means 27 to disengage the detent roller 22 without having to move the spring plate 25. In the reverse direction, the main drive worm 30 drives the main gear wheels 35 until the detent rollers 22 relocate within detent recesses 23. As soon as this occurs, the current drawn by the electric motor of the drive means 27 increases. This is sensed by electronic control means, whereupon it de-energises the motor.

The position of the worm drive 30 shown in FIG. 2 will result in the mirror head 11 and the upper and lower arms 15 and 16 rotating in an anti-clockwise direction when viewed from above. The direction of rotation of the mirror head 11 can be reversed by locating the worm drive 30 on the opposite side of the gear wheels 35.

If the mirror head 11 is to be manually moved to a parked position, or if the mirror head is impacted then the projections 40 will disengage from the recesses 41. The projections 40 are shaped so that when sufficient force is applied to the mirror head 11, the main gear wheel 35 is caused to move laterally along each spigot 36. This movement is resisted by the belleville washer 37 which provides a spring force to the main gear wheel 35. As soon as the projections 40 disengage from each of the recesses 41, the upper and lower arms 15 and 16 are free to rotate about the pivot pin 20. Mirror head 11 can be returned to the deployed position either manually or by operation of the drive means 27.

The drive means 27 may be arranged to operate automatically such as when the ignition key is turned to the off position. In addition, the mirror will move to the deployed position as soon as the ignition key is switched on. Alternatively, switch means may be provided to initiate movement to either the parked or deployed position.

Figure 4:
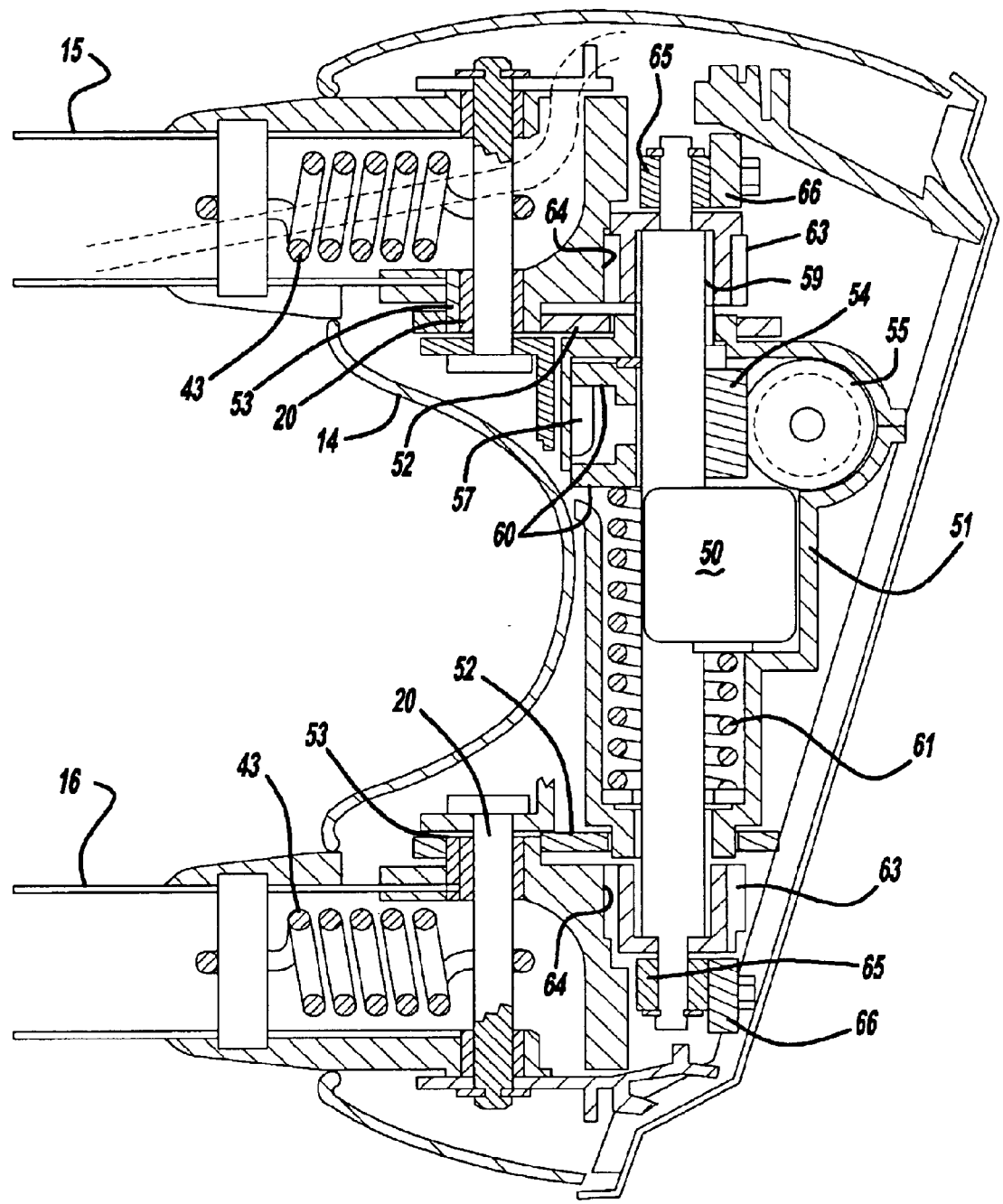
FIG. 4 shows a part cross-sectional view of a second embodiment of a mirror parking mechanism.
Figure 5:
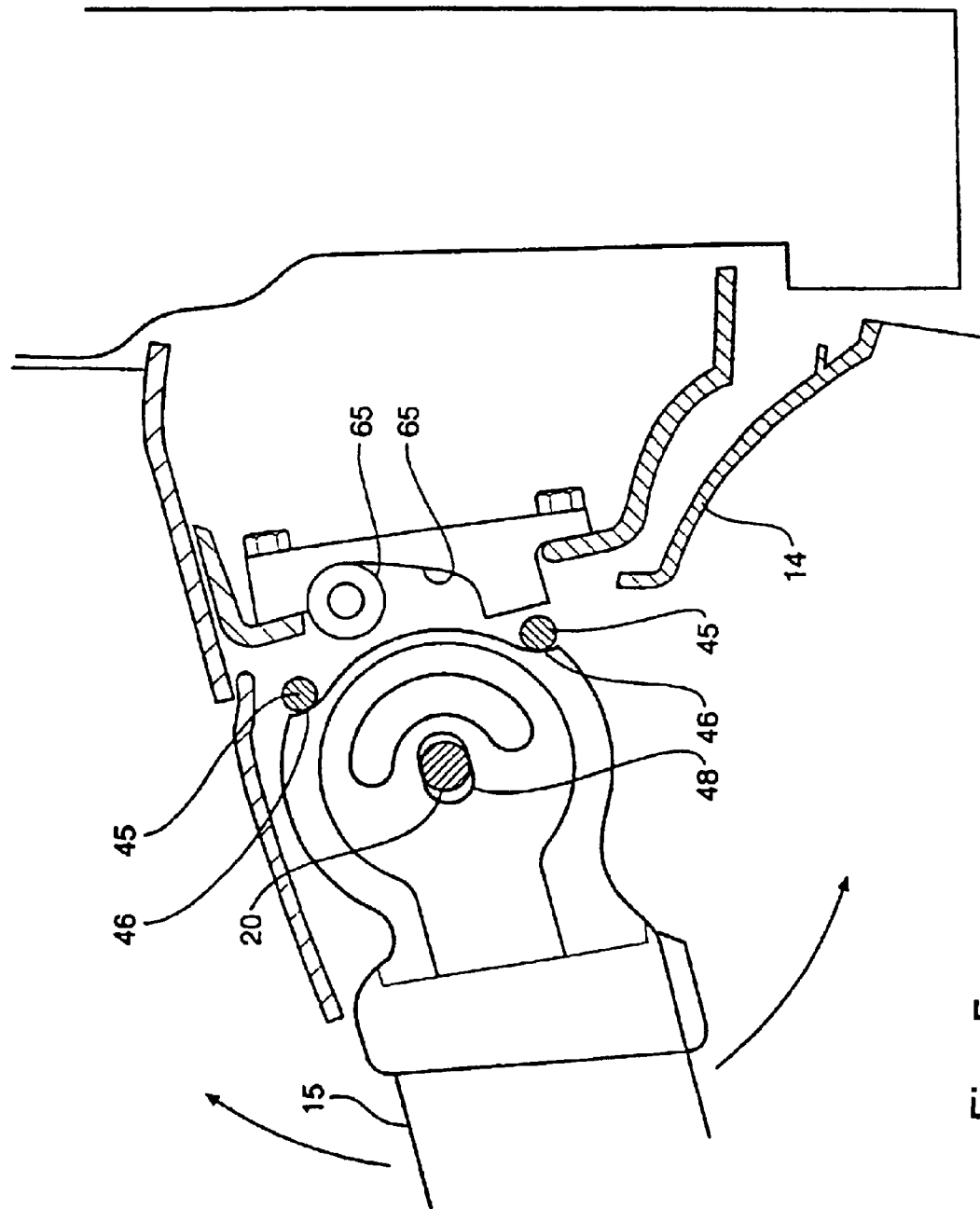
FIG. 5 shows a part plan view of the embodiment illustrated in FIG. 4.
Figure 6:
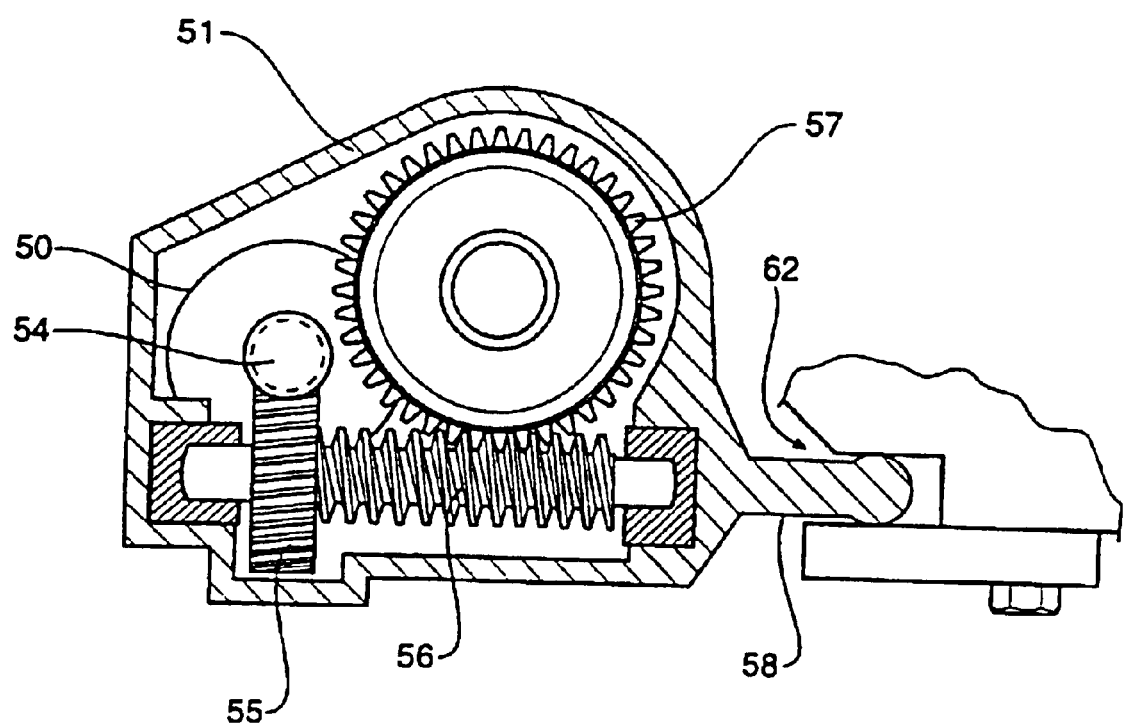
FIG. 6 shows a cross-sectional view of the drive mechanism used in the second embodiment.

A second preferred embodiment is illustrated in FIGS. 4 to 6. This embodiment uses the similar principle of unloading the detents that hold the upper and lower arms 15 and 16.

In this embodiment, springs 43 pull both the upper and lower arms 15 and 16 inwards with respect to the mounting bracket 14 so that the ends of the arms 15 and 16 bear against the detent pins 45. The ends of each arm 15 and 16 are provided with detent recesses 46 into which the detent pins 45 locate. The detent pins 45 are rigidly connected to the mounting bracket 14.

As with the first embodiment, the upper and lower arms 15 and 16 are pivotally attached to the mounting bracket 14 via pivot pins 20. However in this embodiment, each of the ends of the upper and lower arms 15 and 16 are provided with a slot 48 through which the pivot pins 20 locate. This enables some movement of the upper and lower arms 15 and 16 in a direction normal to the axis of the pivot pins 20. This movement is resisted by springs 43.

An electric motor 50 is used to both push the upper and lower arms 15 and 16 away from the detent pins 45 and to then rotate the upper and lower arms 15 and 16 to a parked position. The electric motor 50 and associated drive components are located within a housing 51 that is secured to the upper and lower arms 15 and 16 by links 52. The links 52 are pivotally attached to the housing 51 and to a spigot 53 on each of the upper and lower arms 15 and 16. The housing 51 is restrained from rotating with respect to the mounting bracket 14 by an arm 58 that slides within an aperture 62. An alternative means of restraining the housing 51 would be to connect the links 52 to the housing 51.

The electric motor 50, when energised, drives a worm drive 54 that in turn drives a gear 55. The gear 55 drives a second worm drive 56 which in turn drives a gear 57. The gear 57 is journalled around a shaft 59 which itself is journalled for rotation within the housing 51. The gear 57 is coupled to the shaft 59 via clutch plates 60.

The clutch plates 60 are linked to the shaft 59 via splines. However, if the gear 57 were to disengage from the clutch plates 60, then it would be free to rotate about the shaft 59 A spring 61 is used to force the clutch plates 60 into contact with the gear 57.

As with the previous embodiment, the gear 57 and clutch plates 60 are provided with projections on one of the components which engage recesses in the other component. In normal operating conditions, the spring 61 enables the engagement of the gear 57 with the clutch plates 60 to be maintained to ensure that operation of the electric motor 50 drives the shaft 59.

Gears 63 are fixed to each end of the shaft 59. The gears 63 drive gear sectors 64 which are formed in the ends of the upper and lower arms 15 and 16. Rotation of the gears 63 will attempt to rotate the upper and lower arms 15 and 16 about pivot pins 20. However, the detent pins 45 resist the rotation of the upper and lower arms 15 and 16 which in turn results in the gear sectors 64 remaining stationary with the gears 63 moving the shaft 59 and housing 51 with respect to the gear sectors 64.

The shaft 59 is provided with rollers 65 at each end which engage ramps 66. The ramps 66 are fixed with respect to the mounting bracket 14.

Accordingly, initial operation of the motor 50 will result in the shaft 59 moving along the ramped surface 66, and due to the angle of the ramped surface 66, the shaft 59 will move towards the end of the upper and lower arms 15 and 16. As the housing 51, and therefore the shaft 59, are linked to the upper and lower arms 15 and 16, and as the housing 51 is prevented from rotating about shaft 59 by the arm 58, movement of the shaft 59 will also cause movement of the upper and lower arms 15 and 16. This movement will be against the force provided by the springs 43 which will in turn reduce the force applied to the detent pins 45.

This outward movement of the upper and lower arms 15 and 16 will continue until the force required to move the shaft 59 along the ramps 66 will be greater than the resistance to rotation of the upper and lower arms 15 and 16. At this point, the shaft 59 will remain stationary and the gear sectors 64 will rotate the upper and lower arms 15 and 16 about the pivot pins 20.

The gear ratio between the gears 63 and gear sectors 64 may be of the order of 3:1. A 90° rotation of the mirror head 11 would thus result from a 270° rotation of the shaft 59.

In the case of manual movement of the mirror head 11, the detent force provided by the spring 43 will be overcome, and the gear sectors 64 will drive the shaft via gears 63. This rotation will be resisted due the engagement of the clutch plates 60 with the gear 57. This will result in the projections and recesses between the clutch plates 60 and the gear 57 forcing the gear 57 to separate from the clutch plates 60 against the force provided by spring 61. Once the gear 57 disengages from the clutch plates 60, the shaft 59 will be free to rotate.

Preferably, the clutch plates 60 are designed so that they will only re-engage through alignment of the projections and recesses once the clutch plates 60 have rotated through a full 360°. This will mean that there will be no unwanted re-engagement of the clutch plates 60 during the normal range of movement that would occur in either a forward to rearward manual movement of the mirror head 11.

As will be seen from the above description, both embodiments provide designs which minimises the motor size required to drive the mirror head 11 to a parked position while at the same time providing sufficient detent force to hold the mirror head 11 in its deployed position.

In addition, the designs provide failsafe detents. The detents will re-engage even if the mirror head 11 has been electrically rotated to a parked position and is then manually rotated to its deployed position. This is an important safety feature.

What is claimed is:

1. A mirror parking mechanism for a vehicle exterior rear view mirror that rotates a mirror head to a parked position comprising:
   a mirror mounting bracket,
   a mirror head,
   a pair of arms each attached at one end to said mirror head, the other end of each arm pivotally connected at a pivotal connection to said mounting bracket so that said mirror head can rotate from a deployed position to a parked position where the outermost portion of said mirror head is positioned closer to said vehicle, a pair of detents acting between said mirror mounting bracket and each said arm that changes from a locked position, where said mirror head is held with respect to said mirror mounting bracket, to a disengaged position where said mirror head is able to be rotated with respect to said mirror mounting bracket, a spring acting against said detents to hold them in said locked position, a gear wheel secured with respect to each said arm and journalled with respect to the axis of said pivotal connection between said arms and said mirror mounting bracket, a pair of worm drives each having a shaft that is journalled in bearings in said mirror mounting bracket, that allows movement of said worm drives in a longitudinal direction as well as rotation about their longitudinal axis, said worm drives engaging said gear wheels and one end of each said shaft acting against said spring, and a motor to drive each said worm drive wherein during the initial rotation of each said worm drive said detents prevent rotation of each said gear wheel which causes said worm drives to move longitudinally and push against said spring to in turn reduce the spring force applied to said detents to enable them to disengage whereupon continued rotation of said worm drives cause said gear wheels and mirror head to rotate.

2. A mirror parking mechanism according to claim 1 wherein each said pivotal connection comprises a pin.

3. A mirror parking mechanism according to claim 1 wherein each of said pair of detents comprises a recess on the end of each said arm and a projection that locates in said recess and that is held in place by said spring.

4. A mirror parking mechanism according to claim 3 wherein said spring comprises a plate hinged at an intermediate position and positioned so that each end of said spring bears against and applies a force to one of said detents.

5. A mirror parking mechanism according to claim 4 wherein each said projection comprises a roller journalled for rotation in said spring plate.

6. A mirror parking mechanism according to claim 5 wherein each said gear wheel is journalled with respect to the axis of said pivotal connection between said arms and mirror mounting bracket, and further comprises a clutch between each said gear wheel and said arm that prevents rotation of each said gear wheel with respect to said arm during said rotation of said mirror head, but that allows break-away of said mirror head with respect to each said gear wheel.

7. A mirror parking mechanism according to claim 6 wherein each said clutch comprises a plurality of projections on each said gear wheel and a plurality of recesses within each said arm within which said projections locate and a gear wheel spring that holds each said gear wheel against said arms.

8. A mirror parking mechanism for a vehicle exterior rear view mirror that rotates a mirror head to a parked position comprising:

a mirror mounting bracket, a mirror head pivotally connected to said mounting bracket so that said mirror head can rotate from a deployed position to a parked position where the outermost portion of said mirror head is positioned closer to said vehicle, a detent having a recess on the mirror head and a projection that locates said recess, wherein said detent acts between said mirror mounting bracket and said mirror head that changes from a locked position, where said mirror head is held with respect to said mirror mounting bracket, to a disengaged position where said mirror head is able to be rotated with respect to said mirror mounting bracket, a spring having a plate hinged at one end and positioned so that the other end bears against and applies force on said projection of said detent to hold said detent in said locked position, a gear wheel secured with respect to said mirror head, a worm drive having a shaft that is journalled in bearings in said mirror mounting bracket, that allows movement of said worm drive in a longitudinal direction as well as rotation about its longitudinal axis, said worm drive engaging said gear wheel and one end of said shaft acting against said spring, and a motor to drive said worm drive wherein during the initial rotation of said worm drive said detent prevents rotation of said gear wheel which causes said worm drive to move longitudinally and push against said spring to in turn reduce the spring force applied to said detent to enable it to disengage whereupon continued rotation of said worm drive causes said gear wheel and mirror head to rotate.

9. A mirror parking mechanism according to claim 8 wherein said projection comprises a roller journalled for rotation in said spring plate.

10. A mirror parking mechanism according to claim 9 wherein said clutch comprises a plurality is journalled with respect to the axis of said pivot between said mirror head said mirror mounting bracket and further comprises a clutch between said gear wheel and said mirror head that prevents rotation of said gear wheel with respect to said mirror head during said rotation of said mirror head, but that allows break-away of said mirror head with respect to said gear wheel.

11. A mirror parking mechanism according to claim 10 wherein said clutch comprises a plurality of projections on said gear wheel and a plurality if recesses within said mirror head within which said projections locate and a gear wheel spring that holds said gear wheel against said mirror head.

* * * * *

UNITED STATES PATENT AND TRADEMARK OFFICE
CERTIFICATE OF CORRECTION

PATENT NO. : 6,863,407 B1
DATED : March 8, 2005
INVENTOR(S) : Mark Olijnyk et al.

It is certified that error appears in the above-identified patent and that said Letters Patent is hereby corrected as shown below:

Title page,
Item [75], Inventors, "Gary Gordon" should be -- Garry Gordon --.
Item [57], ABSTRACT,
Line 1, "A minor parking" should be -- A mirror parking --.

Column 5,
Line 55, "shaft 59" should be -- shaft 59. --.

Column 8,
Line 41, "clutch comprises a plurality" should be -- gear wheel --.
Line 43, "said mirror" should be -- and mirror --.
Line 51, "plurality if recesses" should be -- plurality of recesses --.

Signed and Sealed this

Thirteenth Day of September, 2005

JON W. DUDAS
*Director of the United States Patent and Trademark Office*